United States Patent
Johns

(10) Patent No.: US 7,600,076 B2
(45) Date of Patent: Oct. 6, 2009

(54) METHOD, SYSTEM, APPARATUS, AND ARTICLE OF MANUFACTURE FOR PERFORMING CACHELINE POLLING UTILIZING STORE WITH RESERVE AND LOAD WHEN RESERVATION LOST INSTRUCTIONS

(75) Inventor: Charles R. Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/377,506

(22) Filed: Mar. 16, 2006

(65) Prior Publication Data

US 2007/0220213 A1 Sep. 20, 2007

(51) Int. Cl.
*G06F 13/00* (2006.01)
(52) U.S. Cl. ...................... 711/118; 711/152
(58) Field of Classification Search .................. 711/118
See application file for complete search history.

(56) References Cited

U.S. PATENT DOCUMENTS 5,611,074 A * 3/1997 Kantz et al. ................. 711/146

OTHER PUBLICATIONS

Maged et al. Implementation of Atomic Primitives on Distributed Shared Memory Multiprocessors. High-Performance Computer Architecture, 1995. Proceedings. [online] Aug. 6, 2002. [retrieved Jan. 23, 2008]. Retrieved from the Internet <URL:http://ieeexplore.ieee.org/iel2/3040/8763/00386540.pdf?arnumber=386540>.*

Miller. HTTP Conditional Get for RSS Hackers. The Fishbowl. [online] Oct. 21, 2002. [retrieved Jan. 22, 2008]. Retrieved from the Internet <URL:http://fishbowl.pastiche.org/2002/10/21/http_conditional_get_for_rss_hackers>.*

* cited by examiner

*Primary Examiner*—Reginald G Bragdon
*Assistant Examiner*—Larry T Mackall
(74) *Attorney, Agent, or Firm*—Dillon & Yudell LLP

(57) ABSTRACT

A method, system, apparatus, and article of manufacture for performing cacheline polling utilizing store and reserve and load when reservation lost instructions is disclosed. In one embodiment a method is provided which comprises storing a buffer flag busy indicator data value within a first cacheable memory location and setting a load/store operation reservation on said first cacheable memory location via a store and reserve instruction. In the described embodiment, a data value stored within the first cacheable memory location is accessed via a conditional load instruction in response to a determination that the load/store operation reservation on the first cacheable memory location has been reset. Conversely, execution of the conditional load instruction is stalled in response to a determination that the load/store operation reservation on the first cacheable memory location has not been reset.

8 Claims, 6 Drawing Sheets

METHOD, SYSTEM, APPARATUS, AND ARTICLE OF MANUFACTURE FOR PERFORMING CACHELINE POLLING UTILIZING STORE WITH RESERVE AND LOAD WHEN RESERVATION LOST INSTRUCTIONS

CROSS REFERENCE TO RELATED APPLICATIONS

The present application is related to the following United States Patent Applications, which are each hereby incorporated by reference in their entireties:
1) U.S. patent application Ser. No. 11/377,504
2) U.S. patent application Ser. No. 11/377,505

BACKGROUND

1. Technical Field

Embodiments of the present invention relate generally to data processing system operation and more particularly to a method, system, apparatus, and article of manufacture for performing cacheline polling utilizing store and reserve and load when reservation lost instructions.

2. Description of the Related Art

At the advent of modem computing, information handling (e.g., computer) systems comprised a limited number of components including a single processor, system memory, and a small number of input/output (I/O) devices such as display devices, keyboards, and, in conjunction with the creation of graphical user interfaces, cursor control devices (e.g., mice, trackballs, or the like). As information handling systems have developed however, the number of system components which interface with each other via communication and competition for shared system resources has increased dramatically. Modem, conventional information handling systems may therefore include a wide variety of system components (e.g., multiple processors using SMP, ASMP, NUMA, or similar configurations, co-processors, direct memory access controllers, and I/O devices each of which may include additional processors, registers, and memory).

In order to coordinate the activity of system components in modem information handling systems, a number of techniques have been implemented. Interrupts, coupled with interrupt service routines or handlers may be utilized by information handling system components to communicate and/or to indicate the occurrence of an event. Similarly, memory-mapped I/O and port or "port-mapped" I/O may be utilized to provide communication between system components (e.g., processors and I/O devices).

The coordination of activity among elements of an information handling system is of particular importance in the transfer of data between elements for the purposes of performing input/output (I/O) operations. For example, after an information-handling system processor has deposited data in a buffer intended for handling by an I/O device or another processor in a multiprocessor system, the data providing processor will typically notify the I/O device or data-receiving processor that the transfer of data to the buffer is complete. In a conventional information handling system, such notification is typically performed by writing a specific data value into a memory mapped input/output (MMIO) register within the I/O device or data-receiving processor. After a write operation to an associated MMIO register has been detected, the I/O device or data-receiving processor may retrieve data from the buffer via a direct memory access (DMA).

In some conventional information handling systems the completion of DMA retrieval of data can be detected via MMIO register polling or via interrupts. Neither MMIO register polling nor interrupts is an efficient mechanism for detecting the completion of the DMA however because interrupt overhead is typically too great for relatively small buffers and MMIO register polling inefficiently utilizes bus bandwidth which could otherwise be used for DMA transfers, increasing overall system throughput.

In another conventional technique for detecting the completion of a DMA known as "cacheline polling" a predetermined "busy" indicator data value is written into a cacheable memory location, typically known as a buffer flag or semaphore, prior to notifying an I/O device (e.g., via MMIO) of a buffer's availability. The processor then polls the buffer flag for a predetermined "not busy" indicator data value to detect the completion of a corresponding DMA. Since the data is already modified in the processor's cache, cacheline polling does not generate any additional bus activity. After the completion of (DMA) data retrieval from the buffer, the I/O device or receiving processor writes a "not busy" completion data value to the buffer flag. The new buffer flag value can then be accessed by the data-providing processor via a normal cache coherency protocol during which the "busy"-indicating buffer flag data in cache memory is invalidated or replaced by a new completion value.

From a system standpoint, cacheline polling is an efficient polling mechanism. However, in order to implement cacheline polling the data-providing processor executes a set of "polling" instructions repeatedly until the DMA transfer is complete and the buffer flag value is updated, thus wasting valuable system resources (e.g., processor cycles, bus cycles, electrical power, instruction or thread dispatch slots, or the like).

SUMMARY

A method, system, apparatus, and article of manufacture for performing cacheline polling utilizing store and reserve and load when reservation lost instructions are provided herein. In one embodiment, a method is provided which comprises storing a buffer flag busy indicator data value within a first cacheable memory location and setting a load/store operation reservation on said first cacheable memory location via a store and reserve instruction. In the described embodiment, a data value stored within the first cacheable memory location is accessed via a load when reservation lost instruction in response to a determination that the load/store operation reservation on the first cacheable memory location has been reset. Conversely, execution of the load when reservation lost instruction is stalled in response to a determination that the load/store operation reservation on the first cacheable memory location has not been reset.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, software, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same or similar reference symbols within the accompanying drawings is intended to indicate similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
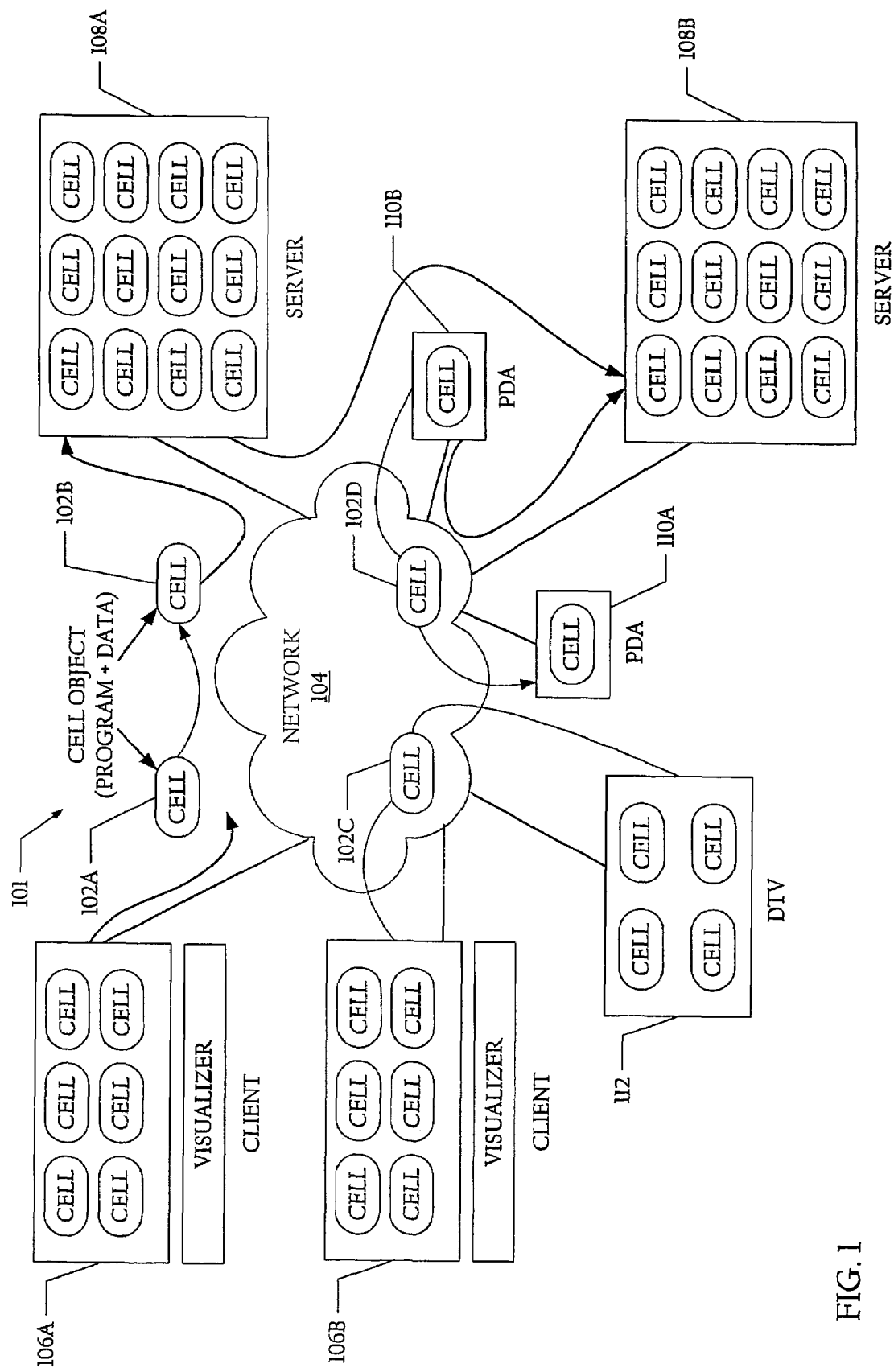
FIG. 1 illustrates a communications network including an information handling system according to an embodiment of the present invention.

Embodiments of the present invention provide store and reserve and load when reservation lost instructions which may be utilized for performing cacheline polling embodied within a method, apparatus, information-handling system, and a machine-readable medium article of manufacture as described herein. FIG. 1 illustrates a communications network including an information handling system according to an embodiment of the present invention. In one or more embodiments of the present invention, a conventional load (LD) instruction executed subsequent to a store and reserve (STAR) instruction as described will complete execution and return data after a previously-set load reservation, which sets the load reservation, has been "lost" or reset and will otherwise typically stall. Similarly, a load when reservation lost (LDRL) instruction may complete execution and return data following the loss or reset of a corresponding load/store operation reservation. In one embodiment, STAR and LDRL instructions may be combined within a single cacheline polling routine loop to correctly manage the setting and resetting of reservations during process context switches. The addition of a LDRL instruction rather than a conventional load allows a program or processor to check the state of a buffer flag data value without unnecessary processor thread stall.

As illustrated in FIG. 1, system 101 includes a network 104 to which a plurality of information handling systems (e.g., computers and computing devices) are coupled. In various embodiments of the present invention, network 104 may comprise a LAN, a global network, such as the Internet, or any other communications network. In the embodiment of FIG. 1, information handling systems coupled to network 104 include client computers 106, server computers 108, personal digital assistants (PDAs) 110, digital television (DTV) 112 and may further comprise other wired or wireless computers and computing devices not shown. In the illustrated embodiment, the processing elements employed by the member information handling systems of network 104 are constructed from a common computing module. These processing elements also preferably all have the same instruction set architecture (ISA) and perform processing in accordance with a common processor instruction set.

In the embodiment of FIG. 1, the number of computing modules included within any particular processing element depends upon the processing power required by the information handling to be performed by that processing element. For example, since servers 108 of system 101 perform more processing of data and applications than clients 106, servers 108 contain more computing modules than clients 106. PDAs 110, on the other hand, perform a relatively smaller amount of processing. In the illustrated embodiment, each computing module contains a processing controller and a plurality of identical processing units for performing parallel processing of the data and applications transmitted over network 104.

This homogeneous configuration for system 101 facilitates adaptability, processing speed and processing efficiency. Because each member of system 101 performs processing using one or more (or some fraction) of the same computing module, the particular computer or computing device performing the actual processing of data and applications is less relevant than in conventional systems. The processing of a particular application and data, moreover, can be shared among the network's members. By uniquely identifying the cells comprising the data and applications processed by system 101 throughout the system, the processing results can be transmitted to the computer or computing device requesting the processing irrespective of where this processing occurred. Because the modules performing this processing have a common structure and employ a common ISA, the computational burdens of an added layer of software to achieve compatibility among the processing elements is avoided. This architecture and programming model facilitates the processing speed necessary to execute, e.g., real-time, multimedia applications.

To take further advantage of the processing speeds and efficiencies facilitated by system 101, the data and applications processed by this system are packaged into uniquely identified, uniformly formatted software cells 102. Each software cell 102 contains, or can contain, both applications and data. Each software cell 102 also contains an ID to globally identify the cell throughout network 104 and system 101. This uniformity of structure for the software cells, and the software cells' unique identification throughout the network, facilitates the processing of applications and data on any computer or computing device of network 104. For example, a client 106 may formulate a software cell 102 but, because of the limited processing capabilities of client 106, transmit this software cell to a server 108 for processing. Software cells can migrate, therefore, throughout network 104 for processing on the basis of the availability of processing resources on the network.

The homogeneous structure of processing elements and software cells of system 101 also avoids many of the problems of today's heterogeneous networks. For example, inefficient programming models which seek to permit processing of applications on any ISA using any instruction set, e.g., virtual machines such as the Java virtual machine, are avoided. System 101, therefore, can implement broadband processing far more effectively and efficiently than conventional networks.

Figure 2:
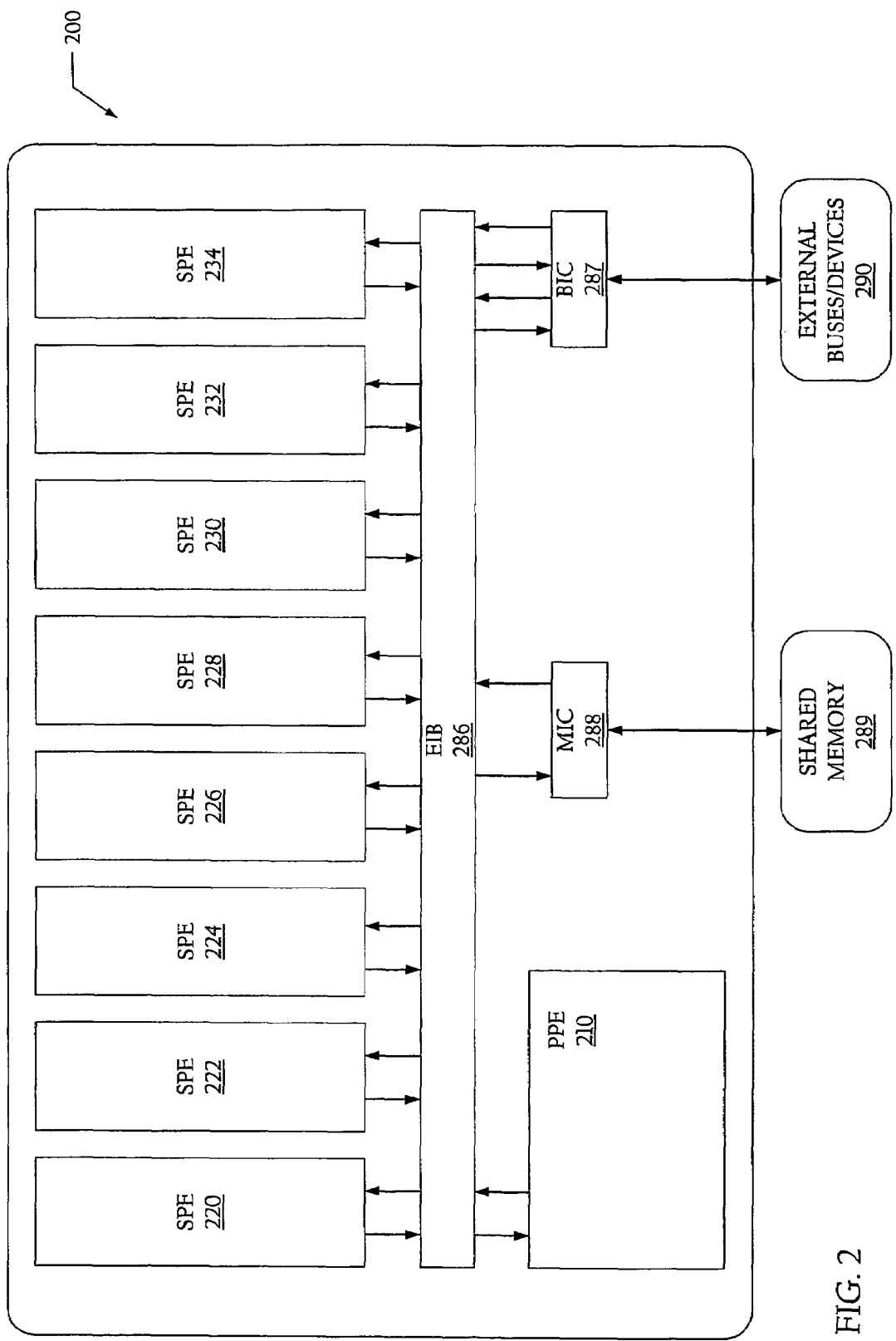
FIG. 2 illustrates a high-level block diagram of an information handling system according to an embodiment of the present invention.

FIG. 2 illustrates a high-level block diagram of an information handling system according to an embodiment of the present invention. While a particular number and arrangement of elements have been illustrated with respect to the information handling system of FIG. 2, it should be appreciated that embodiments of the present invention are not limited to data processing systems having any particular number, type, or arrangement of components and so many encompass a wide variety of data processing system types, architectures, and form factors (e.g., network elements or nodes, personal computers, workstations, servers, or the like).

The depicted information handling system of FIG. 2 is one example of a Cell Broadband Engine (CBE) architecture in which exemplary aspects of the present invention may be implemented. As shown in FIG. 2, CBE 200 includes a power processor element (PPE) 210 and multiple synergistic processor elements (SPEs) 220-234 communicatively coupled together and with additional system elements described further herein via a high bandwidth internal element interconnect bus (EIB) 286. CBE 200 of the illustrated embodiment further includes one or more external buses or devices 290 coupled to EIB 286 via a bus interface controller (BIC) 287 and a shared memory 289 coupled to EIB 286 via a memory interface controller (MIC) 288 as shown.

CBE 200 may be a system-on-a-chip such that each of the elements depicted in FIG. 2 may be provided on a single microprocessor chip. Moreover, in one embodiment CBE 200 is provided as a heterogeneous processing environment in which each of SPEs 220-234 may receive different instructions from each of the other SPEs in the system. Moreover, the instruction set for each of the SPEs is different from that of PPE 210, e.g., PPE 210 may execute Reduced Instruction Set Computer (RISC) based instructions while SPEs 220-234 execute vectorized instructions.

In the illustrated embodiment of FIG. 2, SPEs 220-234 are coupled to each other and to PPE 210 via EIB 286. Additionally, SPEs 220-234 are each coupled to MIC 288 and BIC 287 via EIB 286. MIC 288 provides a communication interface to shared memory 289. Shared memory 289 may comprise any of a number of system memory-type storage elements such as random access memory (RAM), read-only memory (ROM), flash memory, or the like. BIC 287 provides a communication interface between CBE 200 and other external buses and devices 290. Exemplary external devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

In one embodiment of the present invention, PPE 210 is a dual threaded processing element. The combination of this dual threaded PPE 210 and the eight SPEs 220-134 makes the CBE 200 capable of handling 10 simultaneous threads and over 228 outstanding memory requests. In a common operational environment, PPE 210 acts as a controller for the eight SPEs 220-234 which handle most of the computational workload. PPE 210 may be used to execute one or more conventional operating systems while SPEs 220-234 perform vectorized floating point code execution, for example.

In one embodiment, PPE 210 comprises a power processor unit (PPU) or core and associated level 1 (L1) and level 2 (L2) caches (not shown) and each of SPEs 220-234 comprise a synergistic processing unit (SPU), memory flow control units, local memory or store, and a bus interface unit comprising a combination direct memory access (DMA) controller, memory management unit (MMU), and bus interface unit (not shown). In one exemplary embodiment, the described local memory or store comprises a 256 KB instruction and data memory which is visible to PPE 210 and can be addressed directly by software.

PPE 210 may load SPEs 220-134 with small programs or threads, chaining the SPEs together to handle each step in a complex operation. For example, a set-top box incorporating CBE 200 may load programs for reading a DVD, video and audio decoding, and display, and the data would be passed off from SPE to SPE until it finally ended up on the output display. At 4 GHz, each SPE 220-234 gives a theoretical 32 GFLOPS of performance with PPE 210 having a similar level of performance. In operation, PPE 210 may also execute instructions and handle or process data retrieved from shared memory 289 into its local registers or caches via MIC 288. Similarly, an external device 290 may access shared memory 289, for example via BIC 287 and one or more DMA controllers within SPEs 220-234.

Figure 3:
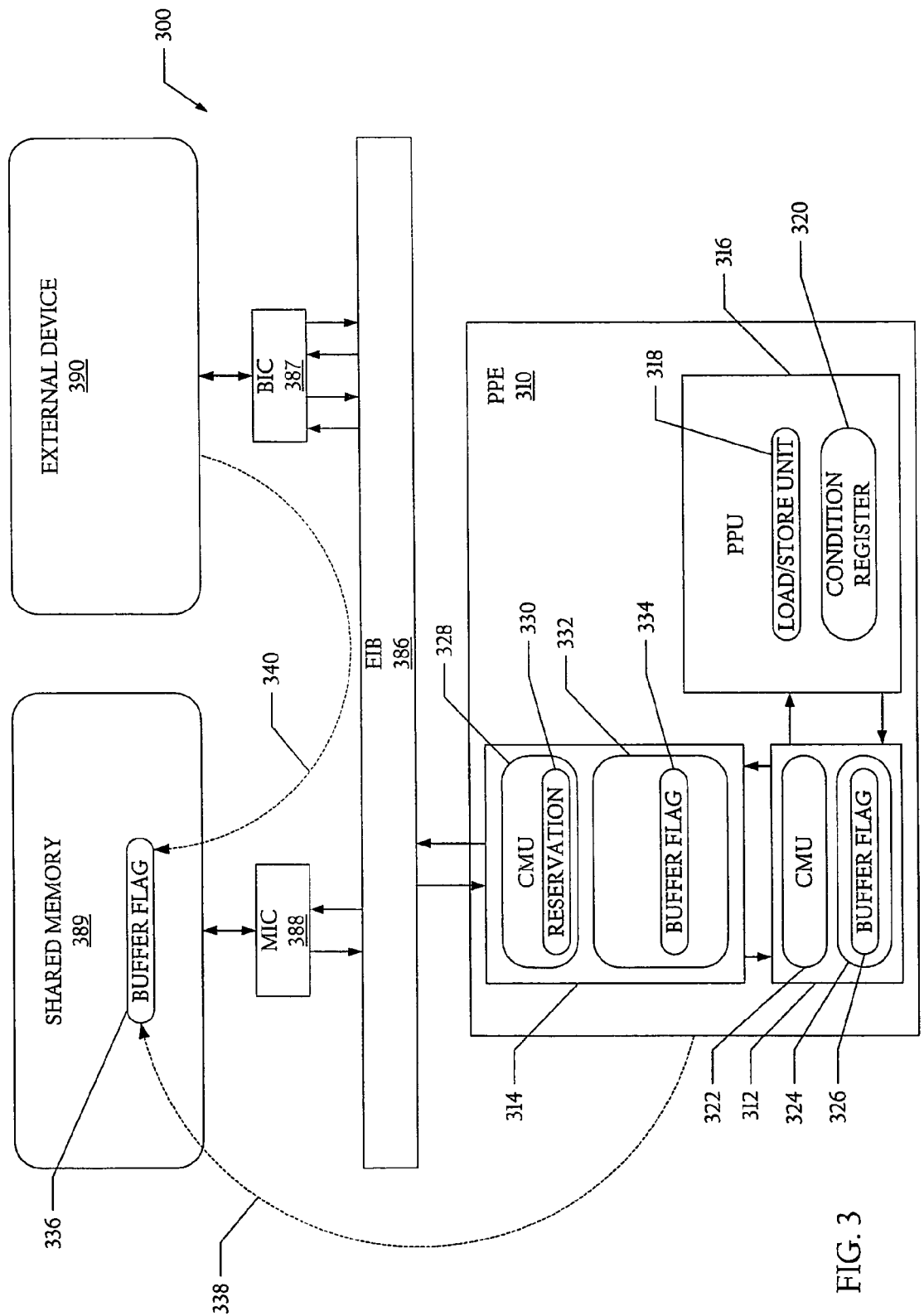
FIG. 3 illustrates a block diagram representation of a selected portion of an information handling system capable of performing cacheline polling utilizing store and reserve and load when reservation lost instructions according to an embodiment of the present invention.

FIG. 3 illustrates a block diagram representation of a selected portion of an information handling system capable of performing cacheline polling utilizing store and reserve and load when reservation lost instructions according to an embodiment of the present invention. Within the present description, similar references numerals have been utilized to denote corresponding system elements between the information handling systems of FIGS. 2 and 3. For example, PPE 310 of the illustrated embodiment of FIG. 3 corresponds to PPE 210 of FIG. 2. Information handling system 300 of FIG. 3 includes a PPE 310 which, via EIB 386, is coupled to shared memory 389 and an external device 390 utilizing MIC 388 and BIC 387, respectively.

In the illustrated embodiment of FIG. 3, shared memory 389 includes a cacheable memory location 336 including data which specifies a buffer flag data value as shown. PPE 310 includes a power processor unit (PPU) 316 hierarchically coupled to an L1 cache 312 and L2 cache 314 as shown. In the embodiment of FIG. 3, PPU 316 includes a number of functional units and data storage elements. More specifically, PPU 316 comprises a load/store unit 318 utilized to execute memory accessing instructions (e.g., loads from memory and stores to memory) and a condition register 320 which stores data in the form of bits or flags indicating the current state of PPU 316, reflecting the result of certain data processing or information handling operations (e.g., data overflow or underflow, positive or negative result, or the like).

Each of L1 cache 312 and L2 cache 314 include a cache management unit (CMU) (e.g., CMU 322 of L1 cache 312 and CMU 328 of L2 cache 314) as well as a storage element (e.g., storage element 324 of L1 cache 312 and storage element 332 of L2 cache 314). CMUs 322 and 328 are each used to control the storage of data and/or instructions within a corresponding one of storage elements 324 and 332, implementing, for example, cacheline replacement algorithms, updating cacheline state or status metadata, or the like. Storage elements 324 and 332 in turn are utilized to store lines or blocks of data comprising application data and/or instructions as well as accompanying metadata (e.g., cache tags, status bits, or the like). While CMUs 322 and 328 has been depicted as integral units or modules of their respective caches, in alternative embodiments of the present invention CMUs 322 and/or 328 or the functionality thereof may be provided in other configurations (e.g., within a single one of L1 cache 312 and L2 cache 314, within PPU 316, as a separate unit or module, or a combination thereof).

According to one embodiment of the present invention, PPU 316 may be utilized to perform cacheline polling via the execution of store and reserve (STAR) and load when reservation lost (LDRL) instructions as will now be described. In operation, load/store unit 318 of PPU 316 may be initially used to execute a STAR instruction to cause data specifying a "busy" buffer flag indicator data value (e.g., 0×BB) to be stored within cacheable memory location 336 of shared memory 389 as indicated by dashed line 338. In the illustrated embodiment, the described STAR instruction is utilized to signal an associated external device 390 (e.g., a graphics device) that data to be retrieved by the device has been stored within an associated buffer (e.g., a dedicated portion of shared memory 389 or other memory within or external to, information handling system 300). In other embodiments of the present invention, additional operations (e.g., exception or interrupt generation, signaling, MMIO write operations, or the like) may be utilized to notify external device 390 that data has been written to the buffer flag stored within cacheable memory location 336 and that the retrieval of data from the described buffer may commence.

Once PPU 316 performs the described STAR, cacheline polling may continue to be performed utilizing PPE 310 in which a LDRL instruction may be executed to cause data stored within cacheable memory location 336 of shared memory 389 to be stored within a register (e.g., a general purpose register) within PPU 316 (not shown). As described further herein, the described STAR and/or LDRL instruction may cause a reservation to be set by storing a specific data value within a reservation register 330 within L2 cache 314.

In one embodiment a reservation is set by storing a logical '1' within a reservation bit of reservation register 330 and a memory address of a corresponding region of memory (e.g., a specific memory location or region associated with cacheable memory location 336 of shared memory 389) with which the reservation is associated. In the described embodiment, the setting and resetting of a reservation within reservation register 330 causes a corresponding reservation status bit to be set or reset within condition register 320. Although reservation register 330 has been illustrated as within CMU 328 of L2 cache 314, in alternative embodiments of the present invention such a reservation register or data may be stored elsewhere within information handling system 300 (e.g., within L1 cache 312, PU 316, a separate bus/EIB interface unit, or the like).

After the reservation has been set, the described LDRL instruction is stalled (e.g., temporarily suspended from execution or issuance/completion) until the reservation is cleared or "reset" following the occurrence of one or more of a number of information handling system events as will be described more fully herein and as indicated by a corresponding reservation status bit within condition register 320. In one embodiment, a reservation may be reset by CMU 328 of L2 cache 314 using a cache "snoop" operation following the detection of an attempt, request, or performance of a write (e.g., by external device 390) to cacheable memory location 336 as indicated by dashed line 340. Once external device 390 has modified the buffer flag data stored within cacheable memory location 336, causing the reservation to be reset and consequently "lost" the previously-stalled LDRL instruction may be resumed, resulting in the hierarchical storage of the buffer flag's data value within storage elements 324 and 332 of L1 cache 312 and L2 cache 314, respectively, and eventually within the designated register within PPU 316.

As will be described more fully herein, once the LDRL operation successfully completes, the retrieved buffer flag data value may be compared to known "busy" and/or "not busy" buffer flag indicator data values. The described comparison may be utilized to determine whether external device 390's retrieval (e.g., via DMA transfer) of data previously stored within an associated buffer has completed such that, for example, the associated buffer may be reused for additional data transfer to external device 390.

Figure 4:
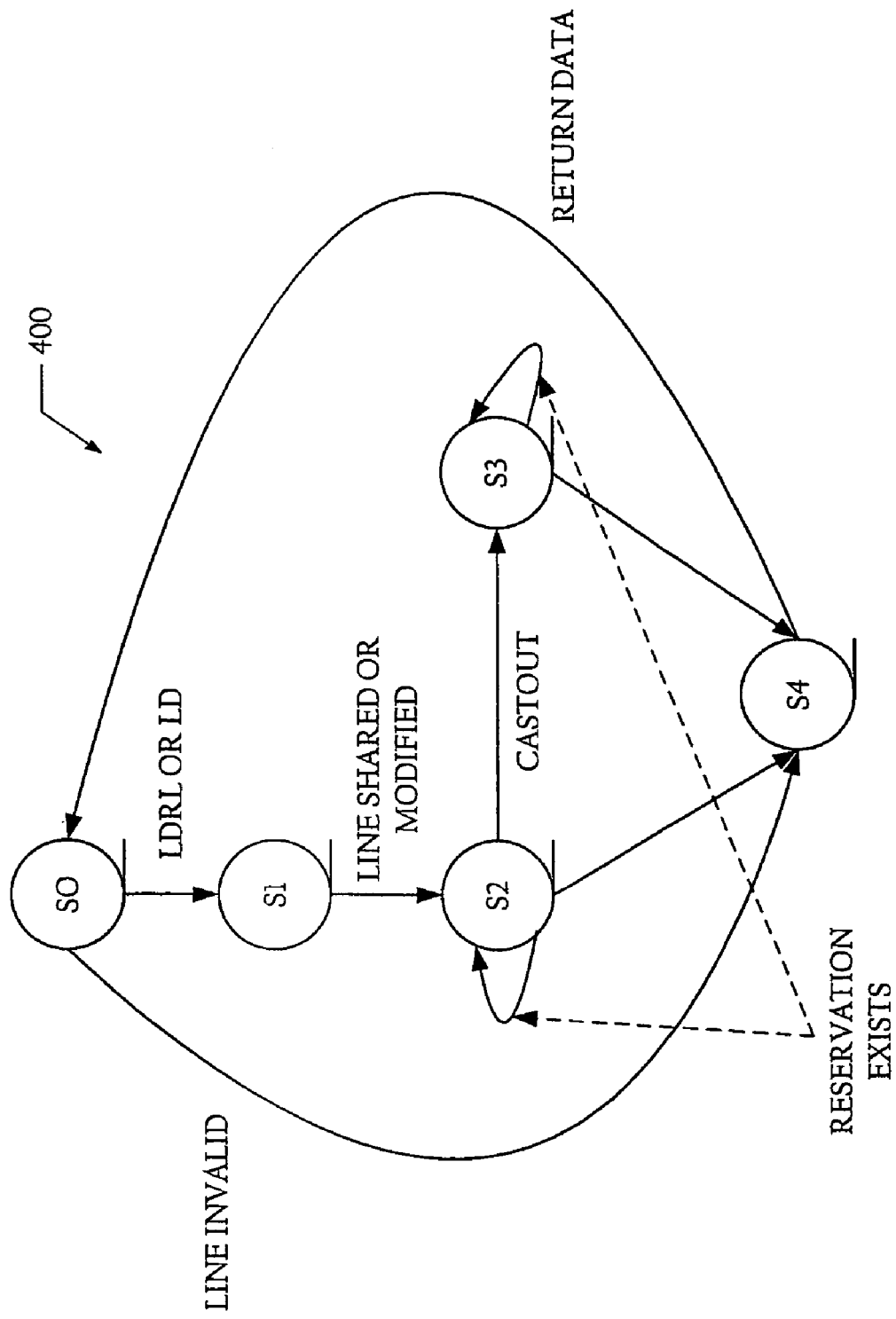
FIG. 4 illustrates a state diagram of a state machine for managing a reservation for store and reserve and load when reservation lost instructions according to an embodiment of the present invention.

FIG. 4 illustrates a state diagram of a state machine for managing a reservation for store and reserve and load when reservation lost instructions according to an embodiment of the present invention. The illustrated "state machine" therefore represents operations to be performed by, or functionality incorporated into, one or more elements of an information handling system (e.g., information handling system 300 of FIG. 3). In one embodiment, such functionality is incorporated into a processing element or unit such as PPU 316 of FIG. 3, in other embodiments, such functionality maybe embodied within a standalone or additional system element capable of monitoring and controlling the operations of an associated information handling system. In one embodiment of the invention, the functionality represented by the state diagram of FIG. 4 is instantiated for each hardware thread initiated or supported.

As shown, state machine 400 includes five separate states, namely, state S0, state S1, state S2, state S3 and state S4. In one embodiment, a store instruction is utilized to set a buffer flag "busy" indicator data value and to initialize the state of buffer data to be accessed. In another embodiment, the described store instruction is further utilized to set a load reservation.

In an initial state S0, state machine 400 records the address of the cacheline for buffer flag after the receipt of a conditional load (e.g., a load when reservation lost instruction), and enters state S1. The described conditional load targets the address corresponding to a cacheline storing a buffer flag. Multiple load reservations can exist concurrently.

In a cache state check state S1, the state of the cache memory is checked. If the cacheline storing a buffer flag is invalid, state machine 400 enters state S4. If the cacheline storing a buffer flag is modified or shared, state machine 400 enters state S2.

In a wait on reservation to be lost state S2, state machine 400 remains idle while the load reservation exist for the load operation. After the load reservation has been lost, state machine 400 enters state S4.

A cache memory has a mechanism to detect if another processor is accessing one of its cachelines. This mechanism is commonly referred to as a snoop machine. A similar process can be used by state machine 400 to determine if a cacheline is being modified by another processor or device. In addition, state machine 400 watches for store instructions to the buffer flag by another thread on the same processor or other processors sharing the cache memory.

If the only exit from state S2 was due to the cacheline storing a buffer flag being modified, the processor could potentially deadlock (i.e., never make any progress). In one or more alternative embodiments of the present invention, other exit conditions are added to cause state machine 400 to enter state S4 even if the load reservation has not been lost in order to avoid a potential deadlock condition. For example, an interrupt may be utilized to initiate or cause a transition from state S2 to state S4. If an interrupt is directed towards a stalled processor or processor thread in the described embodiment, state machine 400 will exit to state S4 to allow the interrupt to be processed. If the interrupt is not processed, the processor or other device may never update the buffer flag.

In another exemplary embodiment, a timeout may be utilized to cause a transition from state S2 to state S4. To avoid waiting an unacceptably long period of time for a transition to occur between state S2 and state S4, software may be utilized to trigger a timeout for the cacheline polling period. With the timeout option, state machine 400 will exit to state S4 after a specified amount of time. In alternative embodiments of the present invention, a timeout value can be set prior to or as a parameter of the load when reservation lost instruction.

In the illustrated state diagram of FIG. 4, a wait on reservation to be lost (buffer flag not in processor's cache) state S3 may be entered if a cacheline storing a buffer flag is castout due to other load instructions or store instructions requiring the same cacheline. State S3 is substantially similar to the previously-described state S2 with the exception that the buffer flag is not stored in the processor's cache memory. The same exit conditions exist for state S3 as they are for state S2 however, the cacheline storing a buffer flag is marked as being no longer valid (i.e., modified or shared) in the processor's cache in state S3. In one embodiment, where cacheline castout operations may cause a reservation to be reset, State S3 may be eliminated. In another embodiment, a transition from state S3 back to state S2 may occur if the cache memory preloads data from the system bus (e.g., cache injection).

In a data forward state S4, the state of the cacheline storing a buffer flag is examined to determine if the buffer flag-storing cacheline contains valid data (i.e., shared, modified, etc.). If so, the data is forwarded to the processor and state machine 400 reenters state S0. This is the case when the buffer flag data has not been modified by a processor or device because the loss of the load reservation is caused by another event (e.g., an interrupt or timeout). In this case, the buffer flag comprises data specifying a "busy" indicator data value and a compare instruction will then be executed. If an interrupt is pending, the interrupt will be processed next. When the interrupt returns, a branch will be taken if the data returned was the "busy" indicator data value. If the branch is taken, then the load reservation initiating the cacheline polling routine will start the load reservation process again.

If the cacheline storing a buffer flag contains invalid data, a "load miss" is generated and buffer flag data is requested from shared memory via the bus. When the buffer flag data is returned, the data is forwarded to the processor, and the state of the cache memory is updated. State machine 400 then enters state S0. This process is the same as a normal load operation that misses in a cache memory. In this case, the data has been modified by the device to comprise a "not busy" indicator data value (e.g., 0×BC or any value not equal to 0×BB).

Thereafter, a compare instruction is performed. If the data returned does not specify the "busy" indicator data value, a branch will not be taken and the cacheline polling routine exits, indicating that an external device has completed the retrieval of data from the associated buffer.

There are several conditions which may cause a reservation to be lost including the invalidation of a cacheline containing data referenced by the address of the load when reservation lost instruction, the modification of the data associated with the address of the load when reservation lost instruction by the same processor or another processor sharing the same cache memory, the presentation of an interrupt to a stalled thread previously executing a load when reservation lost instruction, conventional cacheline replacement/ejection/castout caused by a memory operation of the same processor or another processor sharing the cache where the S3 state previously-described, or the occurrence of one or more other exit conditions (e.g., timeouts for the conditional load instruction).

In the described embodiments, the invalidation of a cacheline can be caused by a device or other processor reading the cacheline with the intention to modify (RWITM) the data stored therein, or by a device or other processor writing the cacheline (write with flush).

While the buffer flag or semaphore has been described herein as stored within a cacheable memory location, in alternative embodiments the memory location need not be cacheable. More specifically, methods or processes of the present invention may be applied to a buffer flag located in a non-cacheable memory location as long as the processor has a means to snoop for a device updating the buffer flag-containing memory address. Locating the buffer flag within a non-cacheable memory location is made apparent by the existence of state S3. In state S3, the buffer flag is not valid in the processor's cache, which is the same state that would exist for a non-cacheable flag.

Figure 5:
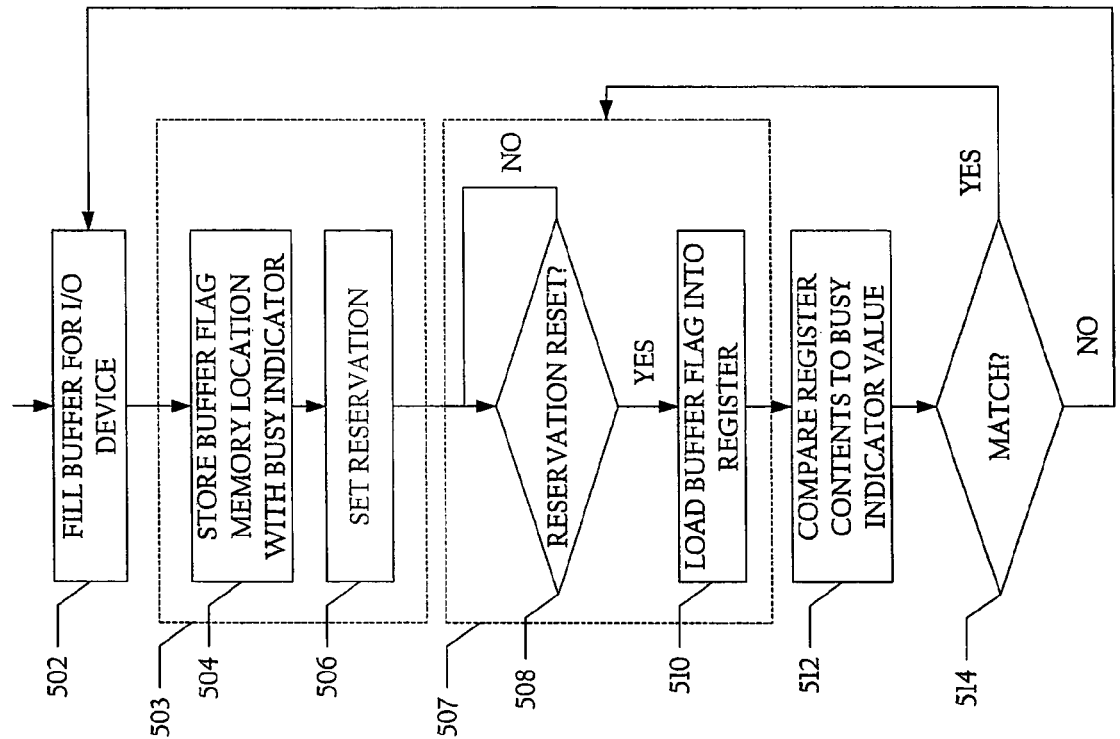
FIG. 5 illustrates a flow diagram of process to perform cacheline polling utilizing store and reserve and load when reservation lost instructions according to an embodiment of the present invention.

FIG. 5 illustrates a flow diagram of process to perform cacheline polling utilizing store and reserve and load when reservation lost instructions according to an embodiment of the present invention. For purposes of illustration, the depicted process embodiment will be described with respect to system elements of information handling system 300 of FIG. 3. Initially in the illustrated process embodiment of FIG. 5, load/store unit 318 of PPU 316 fills a buffer within shared memory 389 with data (e.g., data to be handled or processed by external device 390) (process block 502). In an alternative embodiment of the present invention, the transfer of data to the described buffer may be performed utilizing a DMA controller or engine provided within one or more of SPEs 220-

234. Thereafter, load/store unit 318 executes a store and reserve instruction (process block 503). In the illustrated process embodiment, execution of the described STAR instruction stores data indicating or specifying a "busy" indicator data value within cacheable memory location 336 of shared memory 389 (process block 504) and "sets" a reservation utilizing reservation register 330 (process block 506).

Thereafter, external (e.g., I/O) device 390 may be notified (e.g., by writing to a MMIO register, generating an exception, interrupt, trap, or the like) that the associated data buffer is ready to be accessed (not show). Alternatively, such a notification may be made merely by the storage of a buffer "busy" indicator data value within cacheable memory location 336 as previously described. Load/store unit 318 then executes a load when reservation lost (LDRL) instruction (process block 507). As shown in FIG. 5, the LDRL instruction execution determines whether the reservation has been reset (process block 508) (e.g., by checking one or more bits of flags within condition register 320) and either stalls further execution of the LDRL instruction until the reservation is reset (e.g., via the storage of a "not busy" indicator data value within the buffer flag of cacheable memory location 336 by external device 390) or, once the reservation is reset, loads the buffer flag data stored within cacheable memory location 336 into a register of PPU 316 (process block 510). While a continuous loop has been utilized to depict the determination of when a reservation is reset, it should be appreciated that no actual instructions are executed by either the processor (in a singly-threaded uni- or multi-processor system) or an associated thread (in a multi-threaded processor system), thus saving valuable processing and electrical power otherwise wasted utilizing conventional cacheline polling techniques.

Thereafter, a fixed-point execution unit (not shown) of PPU 316 compares the contents of the register of a PPU 316 to which the buffer flag data of cacheable memory location 336 has been loaded to a specified "busy" indicator data value (process block 512). A branch unit (not shown) of PPU 316 then utilizes the comparison result, determining whether the register contents matched "busy" indicator data value (process block 514). Thereafter, the depicted process embodiment is either restarted completely (process block 502) in response to a determination that the register contents do not match the known "busy" indicator data value or reentered at the point of LDRL instruction execution (process block 507).

Although the operations depicted in FIG. 5 have been described with respect to specific system elements, the actual elements utilized to perform such operations is immaterial to process embodiments of the present invention. Moreover, in alternative embodiments, such operations may be performed by any information handling system elements. Similarly, while the flow diagram depicted in FIG. 5 indicates a particular order of operation and a specific granularity of process operations, in alternative embodiments the illustrated order may be varied (e.g., process operations may be performed in another order or performed substantially in parallel) and one or more of the process operations may be coalesced or fragmented. Similarly, addition process operations may be added where necessary in alternative embodiments of the present invention.

Embodiments of the present invention may include software, information processing hardware, and various processing operations further described herein. The features and process operations of various invention embodiments may be embodied in executable instructions embodied within a machine-readable medium such as shared memory 289, a storage device, a communication device or medium, or the like. A machine-readable medium may include any mechanism that provides (i.e., stores and/or transmits) data in a form readable by a machine (e.g., CBE 200).

For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as PPU 316, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

Figure 6:
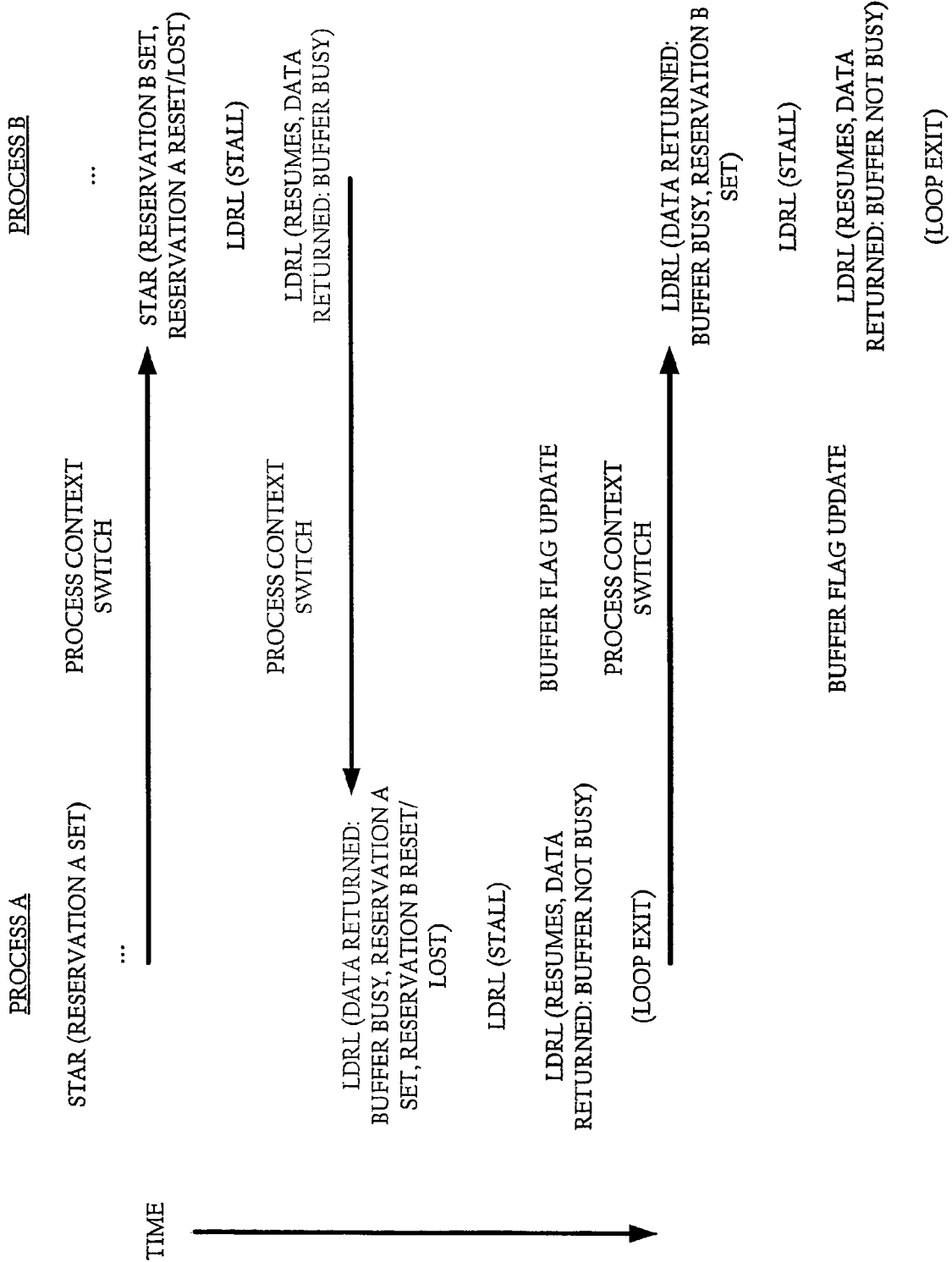
FIG. 6 illustrates an execution flow diagram of a process for performing cacheline polling utilizing inter-process communication via store and reserve and load when reservation lost instructions according to an embodiment of the present invention.

FIG. 6 illustrates an execution flow diagram of a process for performing cacheline polling utilizing inter-process communication via store and reserve and load when reservation lost instructions according to an embodiment of the present invention. As depicted in the execution flow of FIG. 6, the execution of at least two processes (Process A and Process B) is interleaved over a period of time. After the execution of a STAR instruction within the context of Process A, a context switch occurs to the execution context of Process B. The execution of a corresponding STAR instruction within the context of Process B both resets the existing reservation previously held by Process A and sets a reservation for Process B. Execution of a LDRL instruction with the context of Process B then stalls as there exists a reservation for the target address of the LDRL instruction (Process B's reservation) and no data is returned by the LDRL.

Another process context switch then occurs, causing data to be returned for the Process B LDRL instruction resulting in loop entry based upon the determination that the buffer flag data value still indicates a buffer busy condition. Following the context switch back to Process A, data is returned by the re-entered LDRL instruction therein. In the exemplary embodiment of FIG. 6, the returned data indicates a buffer busy condition, causing a loop execution including the re-execution of the LDRL instruction causing another reservation to be set for Process A. Process A is then stalled at the LDRL instruction until the reservation is reset at which point the data (indicating a buffer not busy condition) is returned and the cacheline polling loop for Process A to be exited as shown.

Upon the context switch return to Process B, data is again returned by the re-entered LDRL instruction therein and a corresponding reservation is again set. As shown, data indicating a buffer busy condition is returned at this point causing the loop to be reentered. Upon reentry, the LDRL instruction stalls based upon the reservation state until the buffer flag data value is modified (e.g., by an external device) at which point data indicating a buffer not busy condition is returned at the cacheline polling routine of Process B is exited. While the terms "process" and process context switch have been used herein, it should be appreciated that other execution contexts (e.g., lightweight processes, threads, fibers, or the like).

While the present invention has been described in the context of fully functional data processing system those skilled in the art will appreciate that the present invention is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present invention may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein, changes and modifications may be made without departing from this invention and its broader aspects. Consequently, the appended claims are to encompass within their scope all such changes and modifications as are within the true spirit and scope of this invention and embodiments of the invention are intended to be limited only by the scope of the appended claims, giving full cognizance to equivalents in all respects.

What is claimed is:

1. A method of performing a cacheline polling operation in an information handling system, said method comprising:
    storing data by a processor within a data buffer disposed within a memory which includes a plurality of cacheable memory locations, such that the data buffer is accessible to an external device for retrieval of said data from said data buffer;
    storing a buffer flag busy indicator data value within a first cacheable memory location within said memory and setting a load/store operation reservation associated with said first cacheable memory location via execution of a store and reserve (STAR) instruction, such that said storing of said buffer flag busy indicator value via said execution of said STAR instruction signals an external device having access to said memory that said data has been stored within said memory and may be accessed by said external device;
    executing a load when reservation lost (LDRL) instruction to determine whether said load/store operation reservation has been reset corresponding to a modification of data within said first cacheable memory location by said external device;
    comparing a present data value stored within said first cacheable memory location to said buffer flag busy indicator data value in response to an access by said external device to said first cacheable memory location;
    stalling execution of said LDRL instruction until a determination that said load/store operation reservation associated with said first cacheable memory location has been reset with a "not busy" indicator data value being stored in said first cacheable memory location by said external device; and
    storing additional data in said data buffer by said processor in response to said "not busy" indicator data value being stored within said first cacheable memory location by said external device.

2. The method of claim 1, said method further comprising:
    detecting a process context switch; and
    resetting said load/store operation reservation associated with said first cacheable memory location in response to a detection of said process context switch.

3. The method of claim 1, wherein setting said load/store operation reservation associated with said first cacheable memory location via said STAR instruction comprises:
    resetting a previous load/store operation reservation associated with a second cacheable memory location within said memory; and
    setting said load/store operation reservation associated with said first cacheable memory location in response to a determination that said previous load/store operation reservation associated with said second cacheable memory location has been reset.

4. An apparatus for performing a cacheline polling operation within an information handling system, said apparatus comprising:
    a memory comprising a first cacheable memory location which includes a plurality of cacheable memory locations; and
    a processing element coupled to said memory, said processor comprising:
        means for storing a buffer flag busy indicator data value within a first cacheable memory location within said memory and for setting a load/store operation reservation associated with said first cacheable memory location via execution of a store and reserve (STAR) instruction, such that said storing of said buffer flag busy indicator value via said execution of said STAR instruction signals an external device having access to said memory that said data has been stored within said memory and may be accessed by said external device;
        means for executing a load when reservation lost (LDRL) instruction to determine whether said load/store operation reservation has been reset corresponding to a modification of data within said first cacheable memory location by said external device;
        means for comparing a present data value stored within said first cacheable memory location to said buffer flag busy indicator data value in response to an access by said external device to said first cacheable memory location; and
        means for stalling execution of said LDRL instruction until a determination that said load/store operation reservation associated with said first cacheable memory location has been reset with a "not busy" indicator data value being stored in said first cacheable memory location by said external device.

5. The apparatus of claim 4, said processor further comprising:
    means for detecting a process context switch; and
    means for resetting said load/store operation reservation associated with said first cacheable memory location in response to a detection of said process context switch.

6. The apparatus of claim 4, wherein said means for setting said load/store operation reservation on said first cacheable memory location via said STAR instruction comprises:
    means for resetting a previous load/store operation reservation associated with a second cacheable memory location within said memory; and
    means for setting said load/store operation reservation associated with said first cacheable memory location in response to a determination that said previous load/store operation reservation associated with said second cacheable memory location has been reset.

7. An information-handling system, comprising:
    a memory comprising a first cacheable memory location; and
    a processing element coupled to said memory, said processing element comprising a register to store data specifying a load/store operation reservation associated with said first cacheable memory location; and
    a load/store unit comprising:

first load/store logic to store a buffer flag busy indicator data value within said first cacheable memory location and to set a load/store operation reservation on said first cacheable memory location utilizing said register via execution of a store and reserve (STAR) instruction, such that said storing of said buffer flag busy indicator value via said execution of said STAR instruction signals an external device that data to be retrieved by said external device has been stored at a location accessible to said external device;

second load/store logic to execute a load when reservation lost (LDRL) instruction to determine whether said load/store operation reservation has been reset corresponding to a modification of data within said first cacheable memory location by said external device;

third load/store logic for comparing a present data value stored within said first cacheable memory location to said buffer flag busy indicator data value in response to an access by said external device to said first cacheable memory location; and fourth load/store logic to stall execution of said LDRL instruction until a determination that said load/store operation reservation associated with said first cacheable memory location has been reset with a "not busy" indicator data value being stored in said first cacheable memory location by said external device.

8. The information handling system of claim 7, wherein said processing element further comprises:

a cache memory to store data of said first cacheable memory location; and a cache management unit comprising
  first cache management logic to detect a modification of said buffer flag busy indicator data value within said first cacheable memory location by said external device, and
  second cache management logic to store data within said register indicating said load/store operation reservation associated with said first cacheable memory location has been reset in response to said modification.

* * * * *